(12) United States Patent
Huang (10) Patent No.: US 8,662,491 B2
(45) Date of Patent: Mar. 4, 2014

(54) MULTI-FUNCTION PERIPHERAL WITH JOINING GEAR

(71) Applicants: Cal-Comp Electronics & Communications Company Limited, New Taipei (TW); Kinpo Electronics, Inc., New Taipei (TW)

(72) Inventor: Chung-Liang Huang, New Taipei (TW)

(73) Assignees: Cal-Comp Electronics & Communications Company Limited, New Taipei (TW); Kinpo Electronics, Inc., New Taipei (TW)

( * ) Notice: Subject to any disclaimer, the term of this patent is extended or adjusted under 35 U.S.C. 154(b) by 0 days.

(21) Appl. No.: 13/969,594

(22) Filed: Aug. 18, 2013

(65) Prior Publication Data

US 2013/0328259 A1  Dec. 12, 2013

Related U.S. Application Data (62) Division of application No. 13/802,762, filed on Mar. 14, 2013, which is a division of application No. 13/456,236, filed on Apr. 26, 2012, now Pat. No. 8,444,134.

(30) Foreign Application Priority Data

Nov. 24, 2011 (TW) .............................. 100143034 A (51) Int. Cl.
*B65H 85/00* (2006.01)
*H04N 1/00* (2006.01)

(52) U.S. Cl.
CPC ................................ *H04N 1/00602* (2013.01)
USPC ........... 271/3.14; 271/4.04; 271/4.1; 271/273

(58) Field of Classification Search
USPC ................. 271/3.14, 4.1, 225, 273, 902, 4.04
See application file for complete search history.

(56) References Cited

U.S. PATENT DOCUMENTS

| | | | |
|---|---|---|---|
| 7,934,717 B2 * | 5/2011 | Takeda et al. ................. | 271/225 |
| 8,328,179 B2 * | 12/2012 | Shimomura et al. .......... | 271/186 |
| 8,444,134 B1 * | 5/2013 | Huang .......................... | 271/3.14 |
| 2007/0257422 A1 * | 11/2007 | Suzuki .......................... | 271/225 |
| 2010/0270726 A1 * | 10/2010 | Takeda et al. ................. | 271/3.14 |
| 2011/0115146 A1 * | 5/2011 | Shimomura et al. .......... | 271/186 |
| 2012/0098186 A1 * | 4/2012 | Chung et al. .................. | 271/109 |

* cited by examiner

*Primary Examiner* — Gerald McClain
(74) *Attorney, Agent, or Firm* — Jianq Chyun IP Office (57) ABSTRACT

A multi-function peripheral having an automatic document feeding device (ADF) suited for being configured in a body of an apparatus is provided. The apparatus has a first and second power sources to drive the ADF to transmit a paper in or out of the body. The ADF includes a limiting structure, a swinging member and a blocking member. The first and second power sources drive the limiting structure and the swinging member to swing respectively. The blocking member has a first end connected to the swinging member and a second end extending toward the limiting structure. When the limiting structure is at a second position and the swinging member swings toward a third position, the second end is trapped into the limiting space. When the limiting structure moves toward a first position and the swinging member swings toward the third position, the second end escapes from the limiting space.

6 Claims, 13 Drawing Sheets

MULTI-FUNCTION PERIPHERAL WITH JOINING GEAR

CROSS-REFERENCE TO RELATED APPLICATION

This application is a divisional application of and claims the priority benefit of a prior application Ser. No. 13/802,762, filed on Mar. 14, 2013, now allowed. The prior application Ser. No. 13/802,762 is also a divisional application of and claims the priority benefit of a prior application Ser. No. 13/456,236, filed on Apr. 26, 2012, U.S. Pat. No. 8,444,134, which claims the priority benefit of Taiwan application serial no. 100143034, filed on Nov. 24, 2011. The entirety of each of the above-mentioned patent applications is hereby incorporated by reference herein and made a part of this specification.

BACKGROUND OF THE INVENTION

1. Field of the Invention

The present invention relates to an automatic document feeding device and an operating method thereof and more particularly, to an automatic document feeding device and an operating method thereof suitable for a multi-function peripheral.

2. Description of Related Art

In the modern office, multi-function peripheral machine is one of the indispensable tools. The multi-function peripheral machine includes a copy machine, a printing machine, a scanning machine and other multi-function peripheral having other functions, wherein the printing machine and the scanning machine are the most commonly used. According to the demands of end-users, a double-sided printing (or scanning) apparatus with a double-sided sheet-fed (or scanning) is developed in the market.

In the conventional multi-function peripherals, the paper is transmitted via the multi-roller of the paper transmitting channel disposed in the multi-function peripheral (e.g., the paper feeding roller located at the paper inlet, and the paper exit roller located at the paper outlet). When double-sided printing process is performed, one surface of the paper has to be printed first, and the other surface of the paper is printed after the paper is turned over by the paper feed back channel via the rollers in the multi-function peripheral, and the paper is then transmitted out via the paper exit roller.

Since the paper is transmitted within the same path, in order to prevent paper jammed or paper being processed with repetition, an electric clutch (E-clutch) is commonly disposed between the transmission motor and the paper feeding roller. The E-clutch is used to control the paper feeding roller to feed papers at proper timing. However, the manufacturing cost of the E-clutch is rather expensive, and thus how to reduce the cost and components of the multi-function peripheral has become a focus to researchers and designers in this field.

SUMMARY OF THE INVENTION

The present invention provides an automatic document feeding device and an operating method thereof capable to control the paper transmission path with less component cost.

The present invention provides a multi-function peripheral and automatic document feeding method thereof capable to perform double-sided printing (or scanning) and having lower fabricating costs.

One embodiment of the present invention provides an automatic document feeding device suitable for an apparatus. The apparatus has a body, a first power source and a second power source disposed in the body. The first power source and the second power source drive the automatic document feeding device to transmit a paper into the body or out of the body. The automatic document feeding device includes a limiting structure, a swinging member and a blocking member. The limiting structure is pivoted to the body and connected to the first power source. The first power source drives the limiting structure to move between a first position and a second position. The limiting structure has a limiting space. The swinging member is pivoted to the body and connected to the second power source. The second power source drives the limiting structure to move between a third position and a fourth position. The blocking member has a first end and a second end opposite to the first end. The first end is connected to the swinging member so that the blocking member moves along with the swinging member. The second end extends from the swinging member toward the limiting structure, wherein a moving path of the second end and a moving path of the limiting structure cut across each other. When the limiting structure is at the second position, and when the swinging member moves from the fourth position to the third position, the second end is trapped into the limiting space. When the swinging member moves toward the third position and the limiting structure moves towards the first position, the second end is separated from the limiting space.

One embodiment of the present invention provides an operating method of an automatic document feeding device suitable for the above mentioned automatic document feeding device. The operating method of an automatic document feeding device includes: the first power source drives the limiting structure to move toward the second position, and the second power source drives the swinging member to move toward the third position, so that the second end of the blocking member is embedded in the limiting space. The first power source drives the limiting structure to move toward the first position, and the second power source drives the swinging member to move toward the third position, so that the second end of the blocking member is separated from the limiting space. The first power source drives the limiting structure to move toward the second position, and the second power source drives the swinging member to move toward the fourth position, so that the second end of the blocking member passes through the limiting space.

One embodiment of the present invention provides a multi-function peripheral which includes a main body, a motor, an electromagnetic valve and an automatic document feeding device. The body has a paper inlet and a paper outlet. A paper is adapted to be transmitted into the body via the paper inlet and out of the body via the paper outlet. The motor and the electromagnetic valve are disposed within the body. The automatic document feeding device includes a limiting structure, a swinging member, a gear set, a blocking member and a document feeding gear. The limiting structure is pivoted to the body and connected to the electromagnetic valve. The electromagnetic valve drives the limiting structure to move between a first position and a second position. The limiting structure has a limiting space. The swinging member is pivoted to the body. The gear set is disposed on the swinging member and connected to the motor. The motor drives the gear set to rotate so as to drive the swinging member to move between a third position and a fourth position. The blocking member has a first end and a second end opposite to the first end. The first end is connected to the swinging member so that the blocking member moves along with the swinging member. The second end extends from the swinging member toward the limiting structure, wherein a moving path of the second end and a moving path of the limiting structure cut across each other. The document feeding gear is assembled to the body and located on the moving path of the swinging member. When the swinging member is at the fourth position, the gear set is coupled to the document feeding gear so as to transmit the paper into the body via the paper inlet. When the swinging member removes from the fourth position, the gear set is separated from the document feeding gear. When the limiting structure is at the second position, and when the swinging member moves from the fourth position to the third position, the second end is trapped into the limiting space. When the swinging member moves toward the third position and the limiting structure moves towards the first position, the second end is separated from the limiting space.

One embodiment of the present invention provides an automatic document feeding method of a multi-function peripheral, wherein the multi-function peripheral includes a main body, and a motor, an electromagnetic valve and an automatic document feeding device disposed therein. The automatic document feeding device includes a limiting structure, a linking set, a swinging member, a blocking member, an exit roller and an exit idle roller. The limiting structure is pivoted to the body, and the linking set is connected between the electromagnetic valve and an eccentric side of the limiting structure, so that the electromagnetic valve drives the limiting structure to move between a first position and a second position. The limiting structure has a limiting space. The swinging member is pivoted to the body and connected to the motor. The motor rotates along a first direction so as to drive the swinging member to move from a third position to a fourth position. The motor rotates along a second direction so as to drive the swinging member to move from the fourth position to the third position. The blocking member has a first end and a second end opposite to the first end. The first end is connected to the swinging member so that the blocking member moves along with the swinging member. The second end extends from the swinging member toward the limiting structure. A moving path of the second end and a moving path of the limiting structure cut across each other. The exit roller is connected to the motor and synchronously rotates with the motor. The exit idle roller is connected to the linking set and propped to the exit roller. The automatic document feeding method of a multi-function peripheral includes: the electromagnetic valve drives the limiting structure to move toward the second position, and the motor rotates along the second direction and drives the swinging member to move toward the third position, so that the second end of the blocking member is embedded in the limiting space. The electromagnetic valve drives the limiting structure to move toward the first position to drive the exit idle roller to be separated from the exit roller via the linking set. The electromagnetic valve drives the limiting structure to move toward the second position to drive the exit idle roller to be propped to the exit roller via the linking set. The electromagnetic valve drives the limiting structure to move toward the first position, and the motor drives the swinging member to move toward the third position, so that the second end of the blocking member is separated from the limiting space.

In light of the above, in the embodiment of the present invention, through the moving paths of the swinging member and the blocking member of the automatic document feeding device cutting across each other and implementing together with the moving path of the limiting structure, the multi-function peripheral uses only one motor actuation, the paper can be turned over within the multi-function peripheral, and thus double-sided printing (scanning) process can be successfully performed. Furthermore, the swinging member and the blocking member are simple in structures, and the limiting structure is driven by the electromagnetic valve which is originally disposed in the body, thus the fabricating cost of the multi-function peripheral can be effectively reduced.

In order to make the aforementioned and other features and advantages of the invention more comprehensible, embodiments accompanying figures are described in detail below.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

FIG. 4A to FIG. 12 are schematic views respectively illustrating motions of the partial components disposed on the side board of the automatic document feeding device.

DESCRIPTION OF EMBODIMENTS

Figure 1:
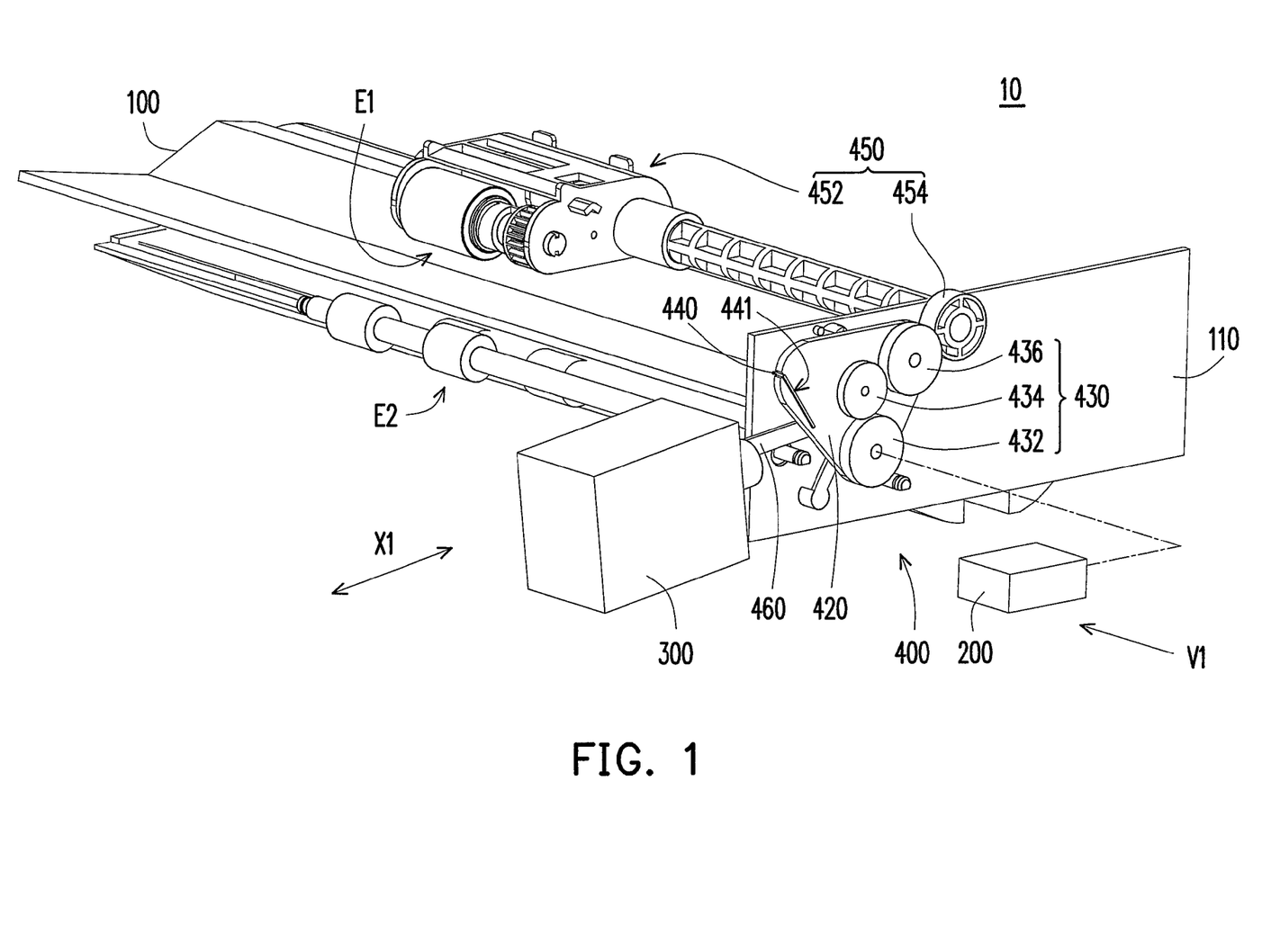
FIG. 1 is a partial schematic view of a multi-function peripheral according to one embodiment of the present invention.
Figure 2A:
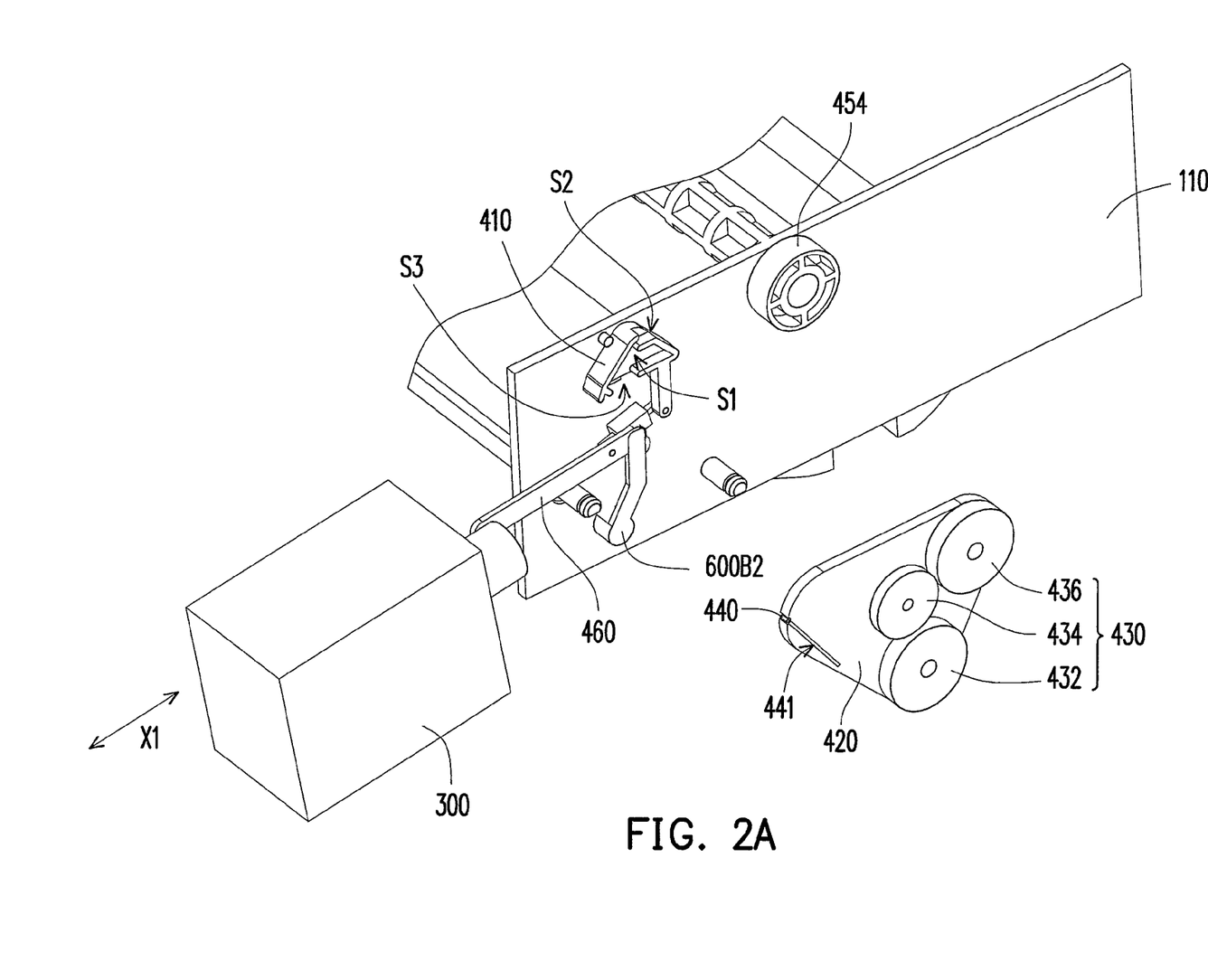
FIG. 2A and FIG. 2B are explosive views of partial components of an automatic document feeding device of the multi-function peripheral of FIG. 1 and respectively illustrate from different viewing angles.
Figure 2B:
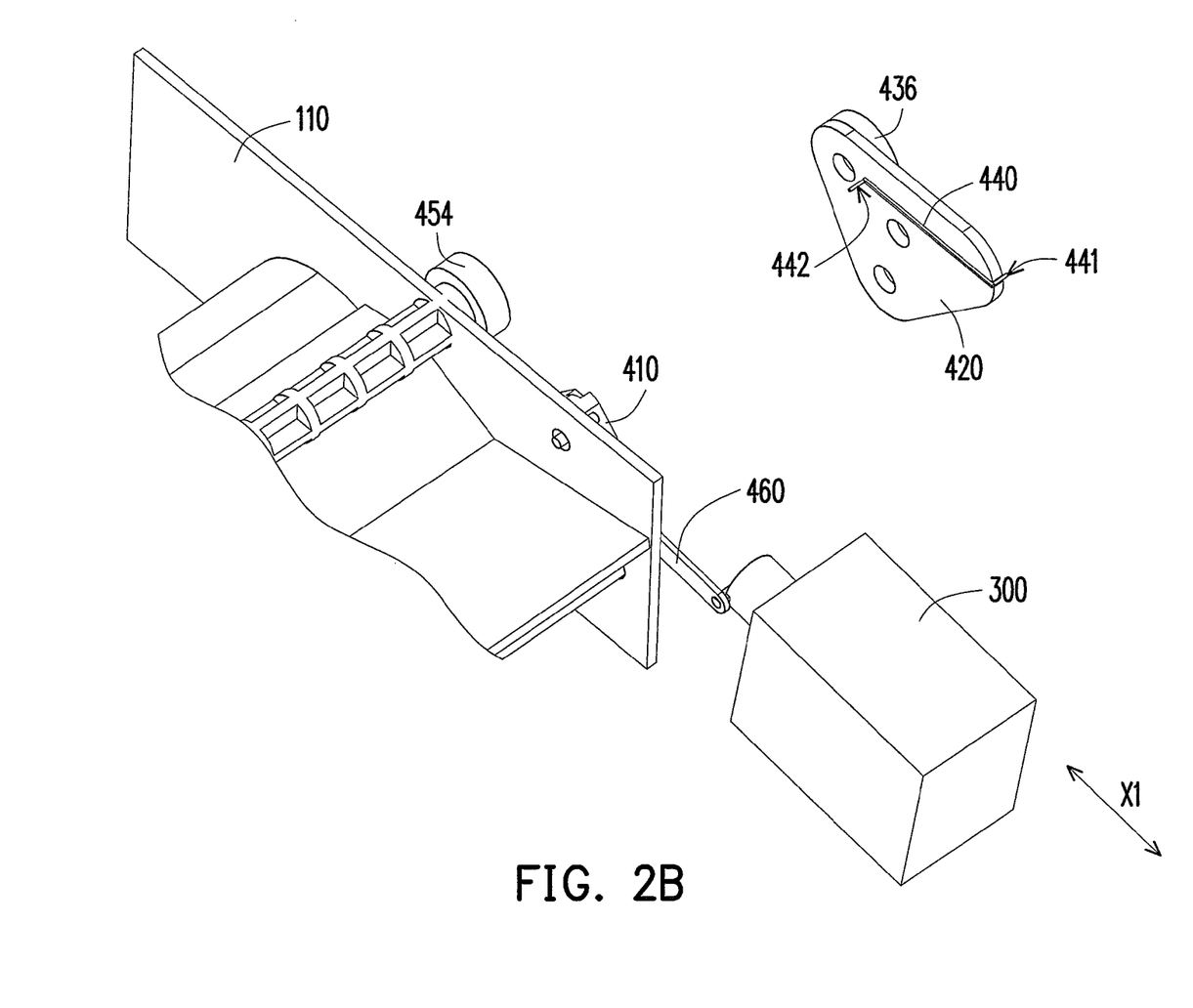
Figure 2C:
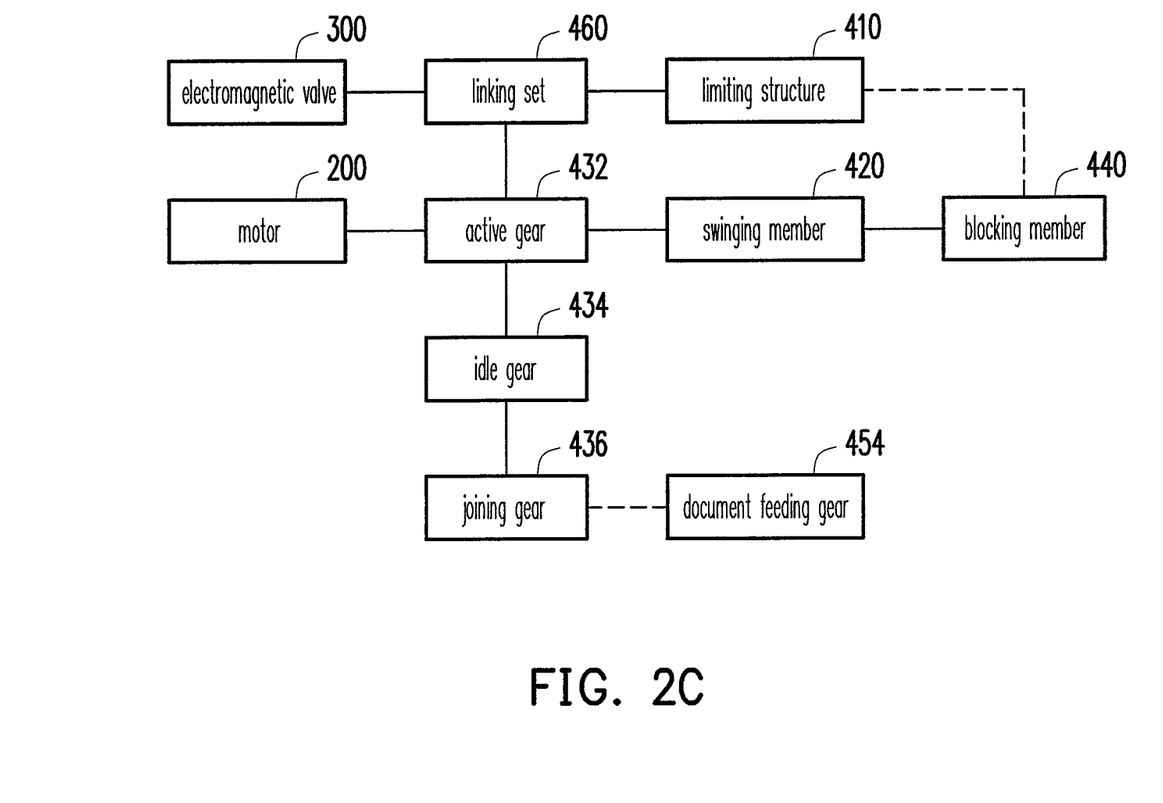
FIG. 2C is a block diagram illustrating a portion of components in the multi-function peripheral of FIG. 1.

FIG. 1 is a partial schematic view of a multi-function peripheral according to one embodiment of the present invention. FIG. 2A and FIG. 2B are explosive views of partial components of an automatic document feeding device of the multi-function peripheral of FIG. 1 and respectively illustrate from different viewing angles. FIG. 2C is a block diagram illustrating a portion of components in the multi-function peripheral of FIG. 1. Referring to FIG. 1, FIG. 2A to FIG. 2C together, in the present embodiment, the multi-function peripheral 10 includes a body 100, a motor 200, an electromagnetic valve 300 and an automatic document feeding device 400, wherein the motor 200, the electromagnetic valve 300 and the automatic document feeding device are disposed in the body 100. The body 100 has a paper inlet E1 and a paper outlet E2. A paper is adapted to be transmitted into the body 100 via the paper inlet E1 and transmitted out of the body 100 via the paper outlet E2. The automatic document feeding device 400 includes a limiting structure 410, a swinging member 420, a gear set 430, a blocking member 440 and a document feeding module 450, wherein the document feeding module 450 includes a document feeding roller set 452 located at the center of the body 100 and adjacent to the paper inlet E1, and a document feeding gear 454 located at a side board 110 of the body 100. In the embodiment, a portion of the document feeding roller set 452 extends toward the side board 110 and protrudes out of the side board 110, and the document feeding gear 454 is disposed thereon, so that when the document feeding gear 454 and the document feeding roller set 452 can be synchronously driven to transmit the paper into the body 100. Furthermore, the limiting structure 410 and the swinging member 420 are respectively pivoted to the side board 110, and the limiting structure 410, the swinging member 420 and the document feeding gear 454 are located at the same side of the body 100, so as to facilitate the limiting structure 410, the swinging member 420 and the document feeding gear 454 implementing together with each other.

Please refer to FIG. 2A to FIG. 2C again, the limiting structure 410 is located between the electromagnetic valve 300 and the document feeding gear 454, connected to the electromagnetic valve 300 and has a limiting space S1. More specifically, the automatic document feeding device 400 further includes a linking set 460 connected between the electromagnetic valve 300 and the limiting structure 410. The linking set 460 is substantially connected to the eccentric side of the limiting structure 410. In this way, when the electromagnetic valve 300 moves back and forth along an axial direction X1 in a linear motion, the limiting structure 410 swings back and forth along the rotating directions R1 and R2. In addition, the swinging member 420 is pivoted to the side board 110, and the gear set 430 is disposed on the swinging member 420. That is, in the embodiment, the limiting structure 410 and the gear set 430 are respectively located at two opposite sides of the swinging member 420.

Moreover, the gear set 430 is connected to the motor 200, so that the motor 200 rotates to drive the gear set 430 to make the swinging member 420 swing back and forth on the side board 110. For example, the gear set 430 includes an active gear 432, an idle gear 434 and a joining gear 436. The active gear 432 is connected between the motor 200 and the swinging member 420, wherein the active motor 432 and the motor 200 are coaxial and synchronous, and drives the joining gear 436 and the active gear 432 to rotate in a same direction by the idle gear 434. Herein designers can use a spring or an element made of a material like rubber to increase the friction force between the active gear 432 and the swinging member 420, and when the motor 200 drives the active gear 432 to rotate, the swinging member 420 can further perform a swinging motion by using the friction force between the components. This may let the joining gear 436 located at the free end of the swinging member 420 to swing along with the swinging member 420 and rotate relatively to the active gear 432.

Additionally, the above mentioned document feeding gear 454 on the side board 110 is located on the moving path of the swinging member 420, i.e., when the swinging member 420 moves towards the document feeding gear 454, it makes the joining gear 436 and the document feeding gear 454 be engaged. Thus, the power of the motor 200 can transmit to the document feeding gear 454 via the gear set 430, and the document feeding roller set 452 can further be driven to move and the paper is transmitted into the body 100 via the paper inlet E1.

It has to be noted that, the blocking member 440 is a torsion spring, for example, i.e., as shown in FIG. 2A and FIG. 2B, the blocking member 440 has a long shaped profile and a first end 441 and a second end 442 opposite to the first end 441, wherein the first end 441 and the second end 442 are hook shaped. The first end 441 is fixedly hooked to the swinging member 420 so that the blocking member 440 moves along with the swinging member 420, and the second end 442 extends from the swinging member 420 toward the limiting member 410. Since the limiting structure 410 driven by the electromagnetic valve 300, the swinging member 420 driven by the motor 200, the gear set 430 located on the swinging member 420 and the document feeding gear 454 are all located on the side board 110, the moving path of the second end 442 of the blocking member 440 moving along with the swinging member 420 can cut cross with the rotating path of the limiting structure 410, wherein during the motion of the limiting structure 410 and the swinging member 420, the orthogonal projection of the limiting structure 410 onto the side board 110 is at least partially overlapped with the orthogonal projection of the swinging member 420 onto the side board 110.

Accordingly, when the swinging member 420 swings, the second end 442 of the blocking member 440 will move relatively to the limiting structure 410, so that the second end 442 can be trapped into the limiting space S1 of the limiting structure 410 under a specific condition, or the second end 442 can be separated from the limiting space S1, so that the swinging member 420 and the limiting structure 410 may be in a condition of implementing together with each other or interfering with each other. In other words, since the shaft of the document feeding gear 454, the shaft of the swinging member 420, the shaft of the gear set 430 and the shaft of the limiting structure 410 are parallel to each other. And through the limiting structure 410, the swinging member 420, the gear set 430, the blocking member 440 and the document feeding gear 454 implementing together with each other, the cooperation or interfering during the motion of the components can be generated.

It should be noted that, in the embodiment, the electromagnetic valve 300 and the motor 200 are used as the first power source and the second power source which drives the swinging member 420, the gear set 430 and the limiting structure 410 to move, respectively. However, the present invention is not limited thereto, i.e., all various apparatuses of current technology which are capable to provide motions to the components to generate corresponding implementations or interfering relationships, are adapted in the present invention.

The detailed motions of the automatic document feeding device are described in the following, and the corresponding document feeding process within the body of the automatic document feeding device is also illustrated.

Figure 3:
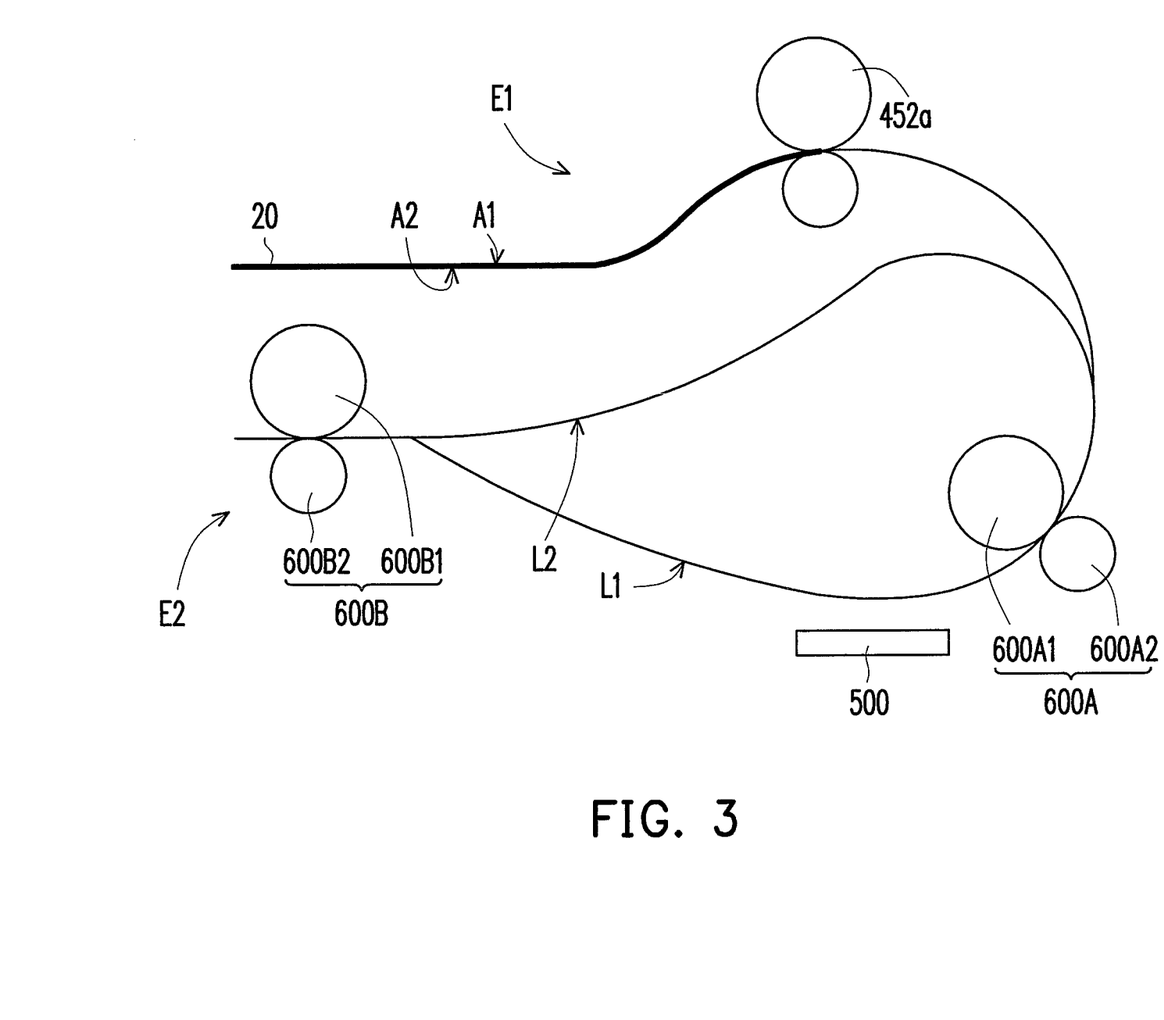
FIG. 3 is a schematic view of a document feeding path in the body of the multi-function peripheral of FIG. 1.

FIG. 3 is a schematic view of a document feeding path in the body of the multi-function peripheral of FIG. 1. FIG. 4A to FIG. 12 are schematic views respectively illustrating motions of the partial components disposed on the side board of the automatic document feeding device, at the same time please refer to FIG. 3 which shows the document feeding process in different statuses of the body to see the corresponding motions of the components. Referring to FIG. 3, it should be noted that, all the components described in the following are drawn in the same viewing angle V1 as in FIG. 1 so that all the motion directions of the components can be synchronized. As shown in FIG. 3, the multi-function peripheral 10 further includes a processing module 500 and a plurality of roller sets 600A and 600B disposed in the body 100. The processing module 500 is a printing unit, a scanning unit or the combination thereof, for example, so as to perform imaging process (printing or scanning) to the paper 20 transmitted into the body 100.

Moreover, the body 100 has a processing path L1 and a paper feed back path L2 adapted to transmit the paper 20, wherein the processing module 500 is disposed under the processing path L1 so as to perform printing or scanning to the paper 20 passing through. And the processing path L1 and the paper feed back path L2 form a loop between the paper inlet E1 and the paper outlet E2 so that the paper 20 can pass through the processing path L1 and the paper feed back path L2 to be turned over.

The roller sets 600A and 600B are disposed on the transmitting path of the paper 20. The number and location of the roller sets 600A and 600B within the body 100 are not limited herein, and designers can correspondingly design as required. However, it has to be noted that, in the present embodiment, the roller set 600A disposed on the processing path L1 includes a transmitting roller 600A1 and a transmitting idle roller 600A2. And the roller set 600B disposed beside the paper outlet E2 includes an exit roller 600B1 and an exit idle roller 600B2, wherein the transmitting roller 600A1 and the exit roller 600B1 are respectively connected to the motor 200, and thus synchronously rotate with the motor 200 in the same rotating direction with the motor 200, so that the transmitting idle roller 600A2 can be contacted with the transmitting roller 600A1 and rotate together (the idle roller 600B2 is contacted with the exit roller 600B1 to rotate together), such that the paper 20 can be clipped and transmitted by means of the transmitting roller 600A1 and the transmitting idle roller 600A2 (the exit roller 600B1 and the exit idle roller 600B2) contacting with each other.

In the present embodiment, the first direction D1 of the components is further defined as a forward rotation, and the second direction D2 as a backward rotation. In substance, when the motor 200 drives the active gear 432 to rotate forwardly, the document feeding roller 452a rotates backwardly, the transmitting roller 600A1 rotates forwardly, the exit roller 600B1 rotates forwardly, so that the paper 20 can be transmitted from the paper inlet E1 to the paper outlet E2. On the contrary, when the motor 200 drives the active gear 432 to rotate backwardly, the document feeding roller 452a does not rotate (because the document feeding gear 454 is separated from the joining gear 436), the transmitting roller 600A1 does not rotate, the exit roller 600B1 rotates backwardly, such that the paper is fed back. Detailed explanations are given below.

Figure 4A:
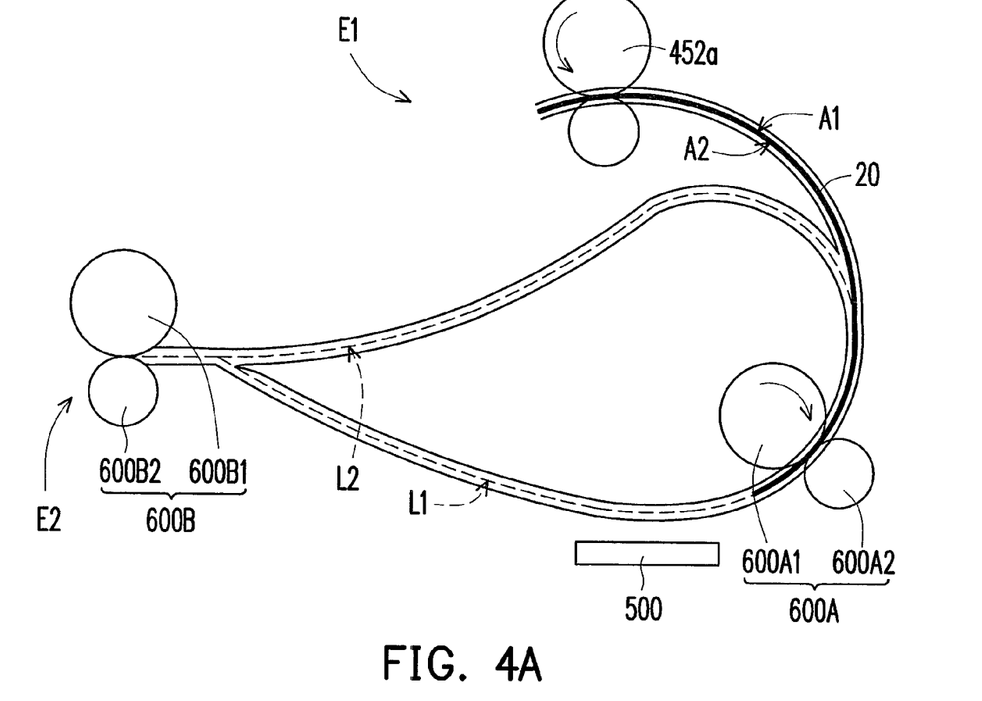
Figure 4B:
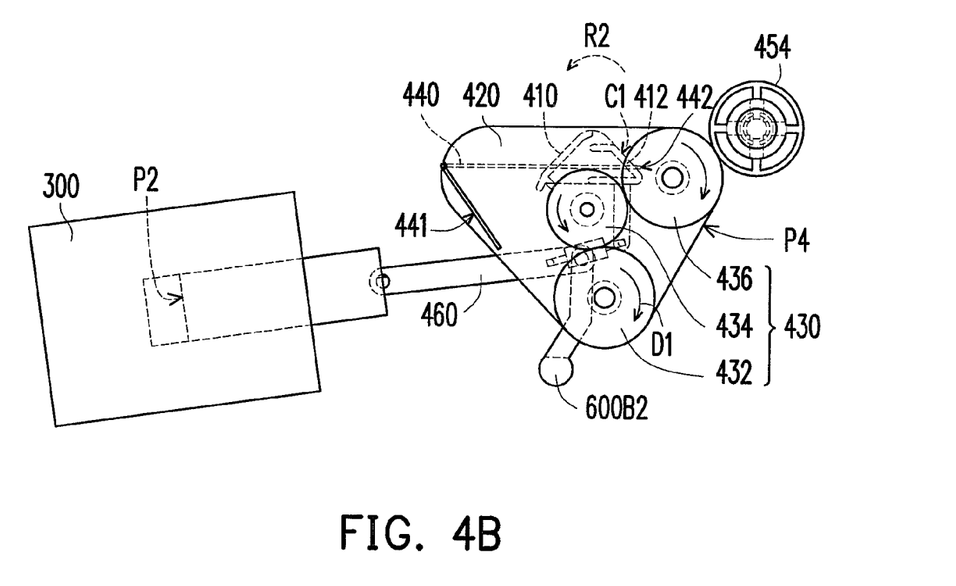

Please refer to FIG. 3, FIG. 4A and FIG. 4B together, first the motor 200 drives the active gear 432 to rotate along the first direction D1 to drive the swinging member 420 to move toward the document feeding gear 454 to reach the fourth position P4, so that the joining gear 436 located on the swinging member 420 is coupled to the document feeding gear 454. Accordingly, the power of the motor 200 can be transmitted to the document feeding roller 452a of the document feeding roller set 452, and the paper 20 is further fed into the processing path L1 in the body 100, and at this time the transmitting roller 600A1 is rotating forwardly due to the coupling of gears, and thus the paper 20 can be transmitted into. It has to be noted that the document feeding roller 452a is the same as the active gear 432, synchronously rotates with the motor 200, and thus the multi-function peripheral 10 of the embodiment can perform all the paper feeding functions by using only one motor 200. At the same time, the electromagnetic valve 300 drives the linking set 460 to drive the limiting structure 410 to move along the rotation direction R2 to reach the second position P2, so that the second end 442 of the blocking member 440 is substantially located between the limiting structure 410 and the document feeding gear 454.

Figure 5:
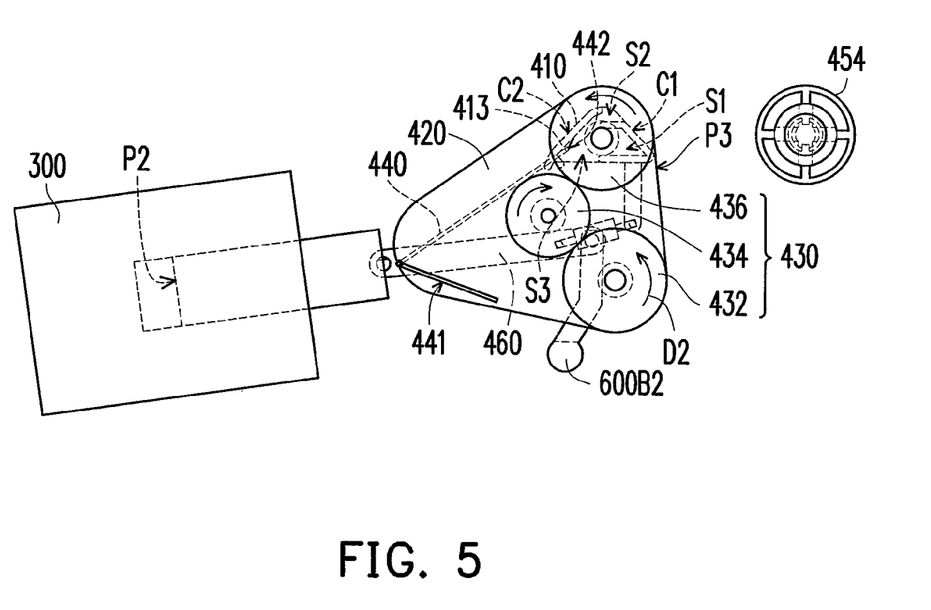

And then, referring to FIG. 5, when the paper is fed, the motor 200 drives the active gear 432 to move along the second direction D2, wherein the first direction D1 and the second direction D2 are opposite to each other, so that the active gear 432 drives the swinging member 420 to move to the third position P3, and thus the joining gear 436 is separated from the document feeding gear 454 to block the transmitting function of the motor 200 to the document feeding roller 452a. In this time, the transmitting roller 600A1 should be rotating backwardly, but the transmitting roller 600A1 is a one way gear and so it is not rotating now, and thus the paper 20 is not transmitted back.

It should be noted that, the limiting structure 410 has an inlet S2 and an outlet S3 which are linking the two opposite sides of the limiting space S1, wherein the inlet S2 is substantially located at a side of the limiting structure 410 adjacent to the document feeding gear 454, and the outlet S3 is substantially located at a side of the limiting structure 410 adjacent to the electromagnetic valve 300. Accordingly, when the swinging member 420 moves toward the third position P3, the second end 442 of the blocking member 440 may move along the first outer profile C1 of the limiting structure 410, and moves into the limiting space S1 via the inlet S2. When the swinging member 420 moves to the third position P3, the second end 442 of the blocking member 440 is interfered with the third blocking portion 413 of the limiting structure 410, so that the second end 442 of the blocking member 440 is trapped into the limiting space S1, and the swinging member 420 is stopped at the third position P3.

Figure 6A:
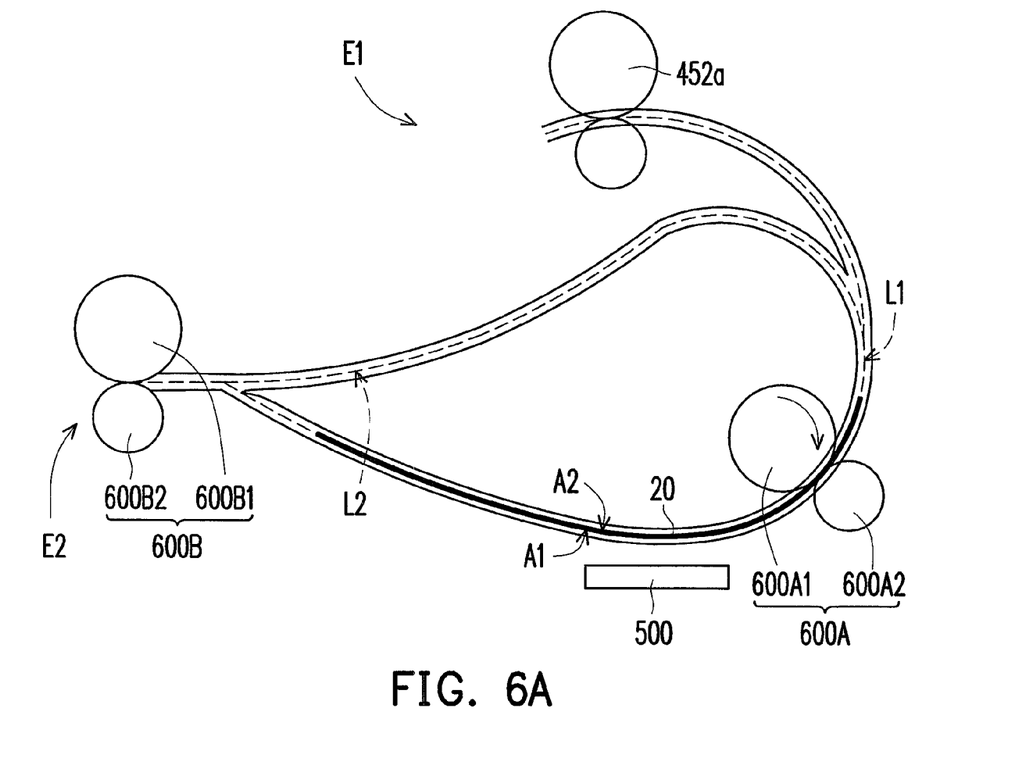
Figure 6B:
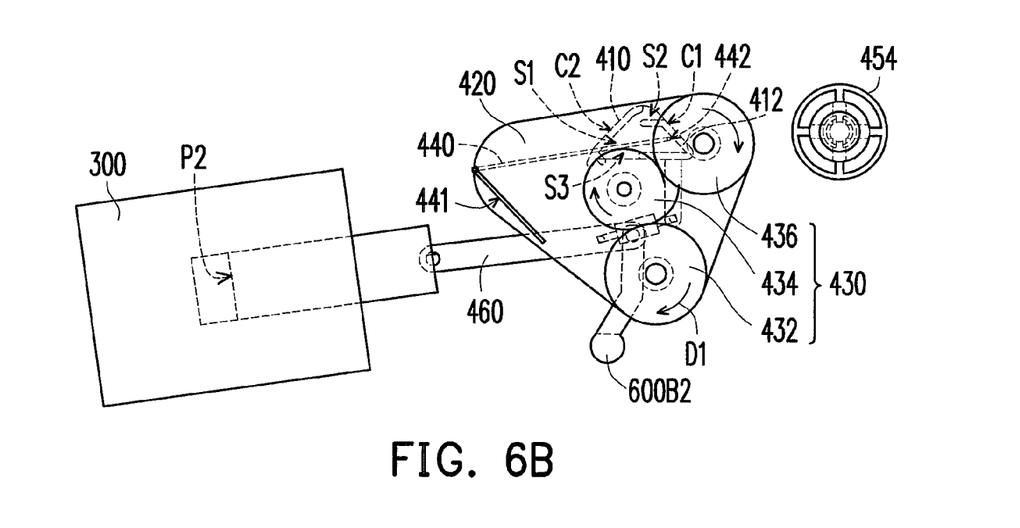

Please refer to FIG. 6A and FIG. 6B, consequently, the motor 200 drives the active gear 432 to rotate along the first direction D1, and in this time the transmitting roller 600A1 is rotating forwardly, so that the first surface A1 of the paper 20 passes through the processing module 500 for performing printing or scanning process to the paper 20. In this time, the active gear 432 rotates along the first direction D1 and drives the swinging member 420 to swing in the same direction, and thus the second end 442 of the blocking member 440 also moves toward the document feeding gear 454. However, in this time the electromagnetic valve 300 does not drive the limiting structure 410 to move yet (i.e., the limiting structure 410 is still maintained at the second position P2 which is the same as in FIG. 4B), and thus the second end 442 of the blocking member 440 is interfered with the second blocking portion 412 of the limiting structure 410, and the swinging member 420 is stopped between the third position P3 and the fourth position P4. Therefore, the joining gear 436 cannot be coupled to the document feeding gear 454. Accordingly, the document feeding roller 452a is in an idle status to stop another paper (not shown) located at the paper inlet E1 being transmitted into the processing path L1. Thus, occurrence of paper jamming on the processing path L1 due to the multi-function peripheral 10 simultaneously performing the document feeding process and the printing (scanning) process can be prevented.

To sum up the motions of the components, because of the material and the structure characteristics of the blocking member 440, the stiffness of the blocking member 440 on the extending direction T1 is greater than that of non-extending direction T2, i.e., compared to the extending direction T1, the blocking member 440 has flexibility in the non-extending direction T2. Thus, when the swinging member 420 moves from the fourth position P4 to the third position P3, though the moving path of the blocking member 440 is blocked by the limiting structure 410, the blocking member 440 can still move along the first outer profile C1 and generate deformation, and further can enter the limiting space S1 via the inlet S2. However, when the blocking member 440 moves backwardly, its second end 442 is structurally blocked at the second blocking portion 412, and it leads to the blocking member 440 incapable of separated from the limiting space S1.

Figure 7A:
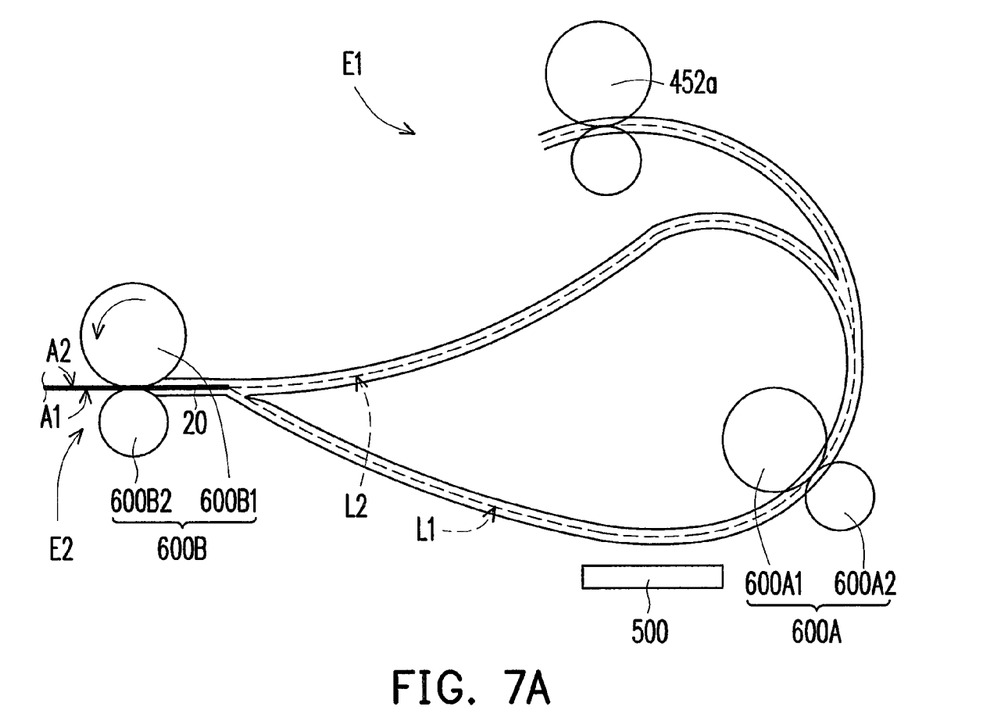
Figure 7B:
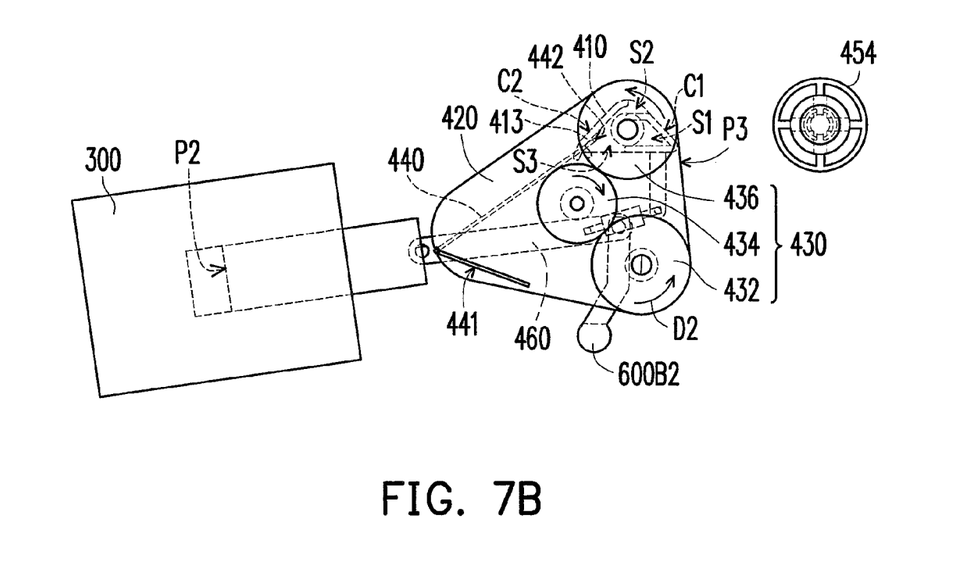

Then, referring to FIG. 7A and FIG. 7B, in the present embodiment, in this time, the first surface A1 of the paper 20 has already completed the printing (scanning) process and is transmitted to the paper outlet E2. And the paper 20 is still remained at the roller set 600B, thus the motor 200 may drive the exit roller 600B1 to move along the second direction D2, i.e., the exit roller 600B1 may rotate backwardly and feed the paper 200 back, so that the paper 20 is transmitted to the paper feed back path L2 to be ready to perform the next printing (scanning) process. In this time at the limiting structure 410, the electromagnetic valve 300 has not driven the limiting structure 410 to move yet, and the limiting structure 410 may still remain at the second position P2. However, the motor 200 drives the active gear 432 to rotate along the second direction D2, such that the swinging member 420 may move along with the active gear 432 to reach the third position P3. In the meanwhile, similar to the FIG. 5, the second end 422 of the blocking member 440 is blocked at the third blocking portion 413 and is not separated from the limiting space S1.

Figure 8A:
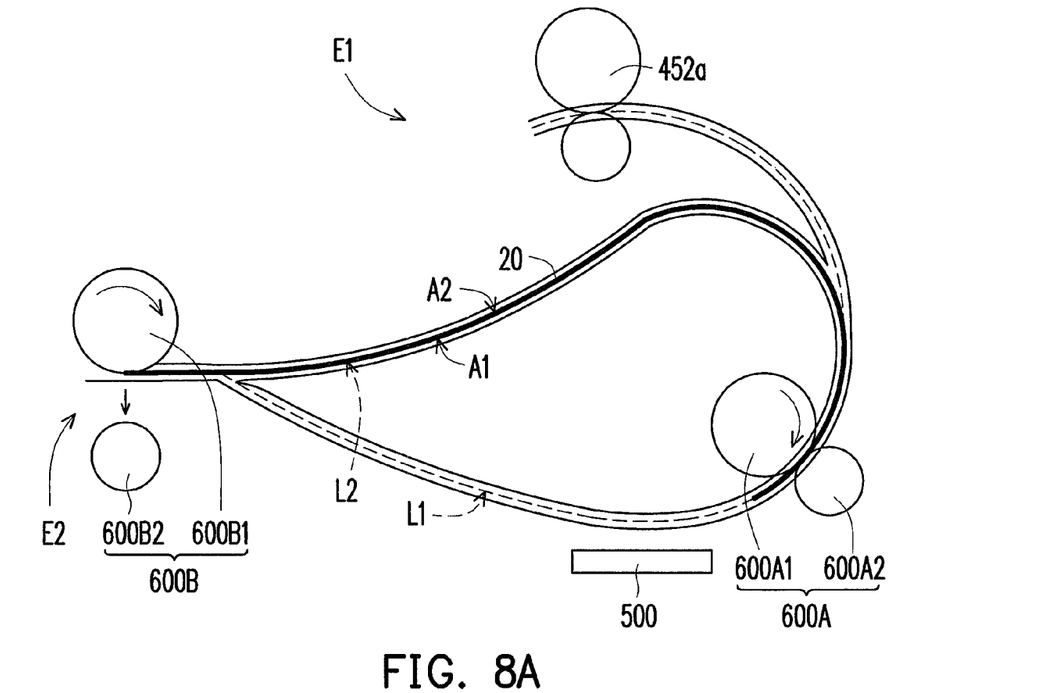
Figure 8B:
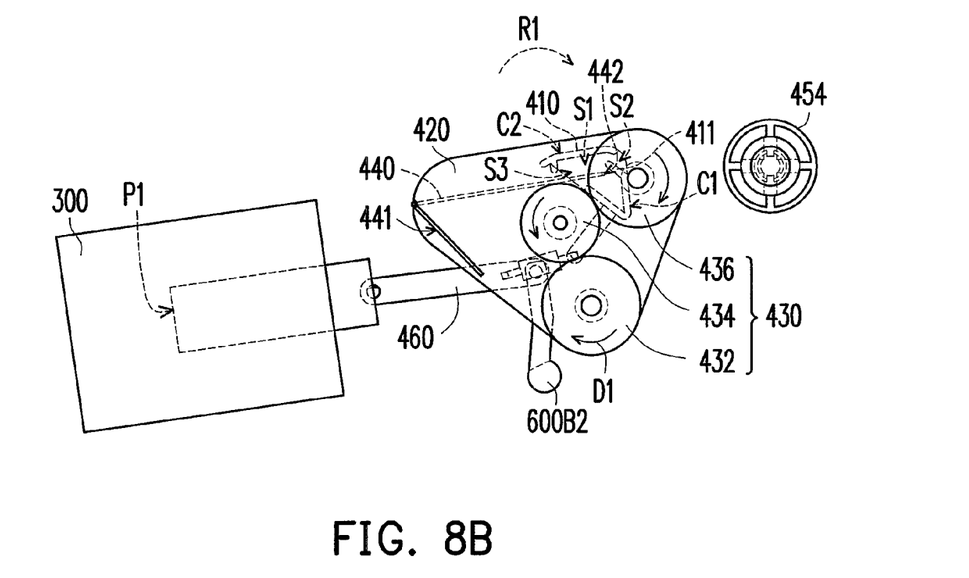

Please refer to FIG. 8A and FIG. 8B, when the paper 20 reaches the roller set 600A, the motor 200 rotates in the first direction D1, such that the transmitting roller 600A1, the exit roller 600B1 and the active gear 432 all rotate in the first direction D1, wherein the transmitting roller 600A1 rotates along the first direction D1, so that the paper 20 is ready to be transmitted to the processing path L1 and the second surface A2 of the paper 20 can receive the imaging process of the processing module 500.

It should be noted that, in the present embodiment, the exit idle roller 600B2 is connected to the linking set 460, i.e., the exit idle roller 600B2 is able to be transformed between being contacted with or separated from the exit roller 600B1 because of the driving of the electromagnetic valve 300. In other words, in the status of FIG. 8B, when the electromagnetic valve 300 moves the limiting structure 410 to the first position P1 via the linking set 460, the exit idle roller 600B2 located on the linking set 460 also moves along with the linking set 460 to be separated from the exit roller 600B1. Accordingly, the paper 20 is not exerted by the transmitting force of the exit roller 600B1. That is, the exit roller 600B1 cannot clip and transmit the paper 20 without being contacted with the exit idle roller 600B2.

In this way, when the paper 20 is on the paper feed back path L2 and simultaneously touches the exit roller set 600A and 600B, the rotation directions of the exit roller 600B1 and the paper 20 transmission are opposite. And since the exit idle roller 600B2 is not contacted with the exit roller 600B1 in this time, thus paper jamming may not occur due to the paper 20 exerted by the transmitting forces propping to each other.

Furthermore, in the meanwhile under the condition of the limiting structure 410, driven by the electromagnetic valve 300, moving along the rotation direction R1 to the first position P1, the swinging member 420 also swings along with the active gear 432 toward the fourth position P4, and the second end 442 of the blocking element 440 is interfered with the first blocking portion 411 of the limiting structure 410 so that the swinging member 420 stops between the third position P3 and the fourth position P4.

Figure 9A:
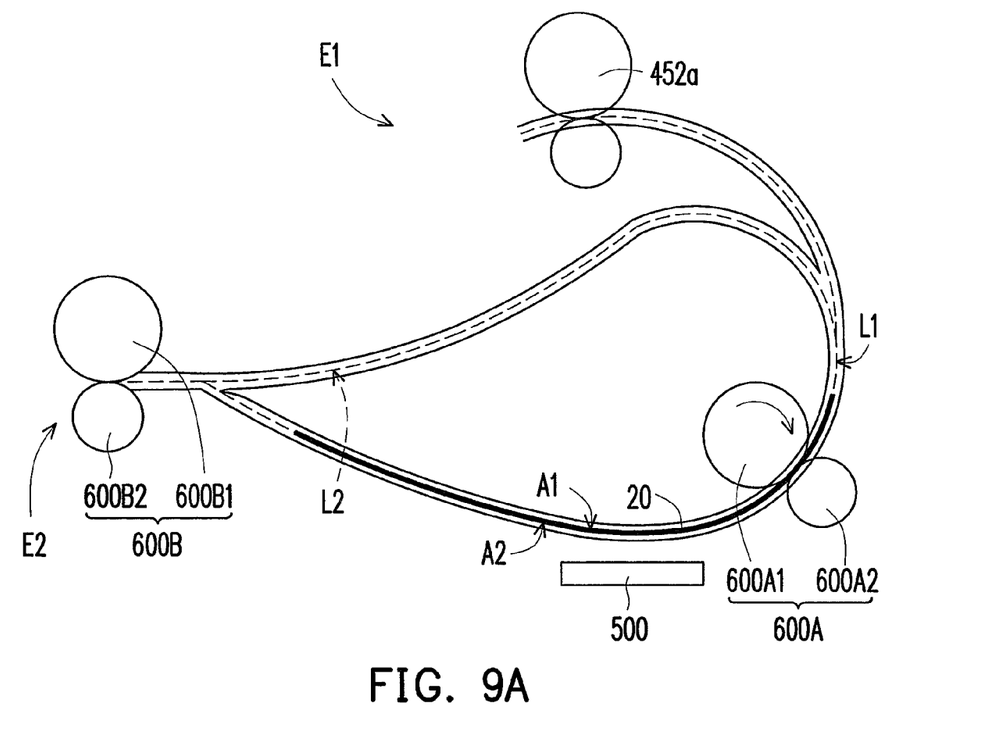
Figure 9B:
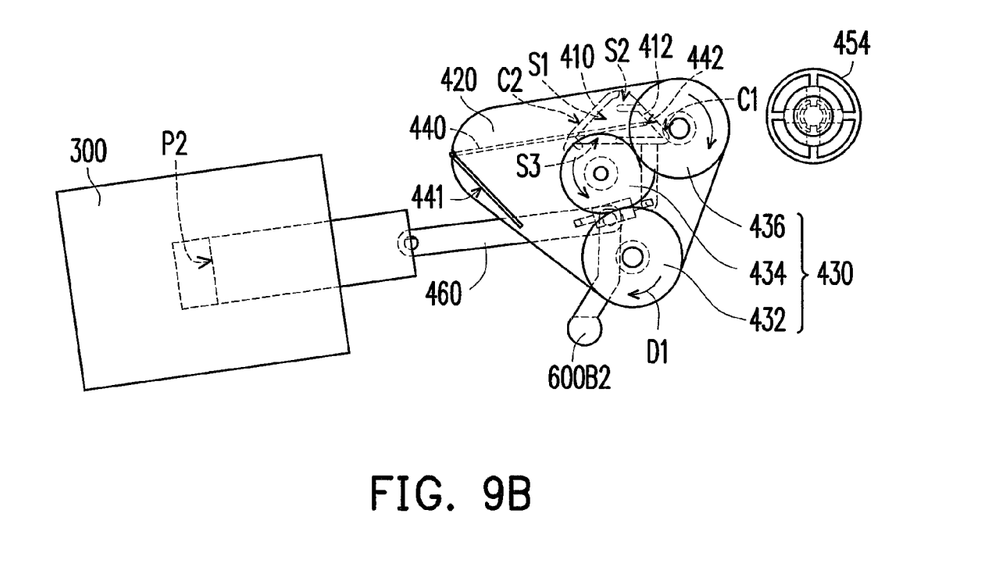

Please refer to FIG. 9A and FIG. 9B, consequently, the motor 200 may proceed to rotate along the first direction D1, and in this time the transmitting roller 600A1 rotates forwardly to transmit paper 20, so as to drive the roller set 600A to transmit the paper 20 to the processing module 500, to perform imaging process to the second surface A2 of the paper 20. At the same time, the electromagnetic valve 300 drives the limiting structure 410 to move along the rotation direction R2 back to the second position P2, thus the swinging member 420 swings in the same direction with the active gear 432, and the second end 442 of the blocking member 440 moves toward the document feeding gear 454, such that the second end 442 is interfered with the second blocking portion 412 of the limiting structure 410 (the same as those depicted in FIG. 6), and the swinging member 420 stops between the third position P3 and the fourth position P4.

Moreover, after the second surface A2 of the paper 20 is printed (scanned), the paper 20 may pass through the paper feed back path L2 and be transmitted to the processing path L1 again, but it is unnecessary to perform any printing (scanning) process to the paper 20 by using the processing module 500, so as to achieve the function of turning over the paper 20. In this time the relative components of the multi-function peripheral 10 and the motions thereof is the same as those described in FIG. 7A, FIG. 7B, FIG. 8A and FIG. 8B (only the first surface A1 and the second surface A2 of the paper 20 is reverse), and it is not repeated herein.

Figure 10A:
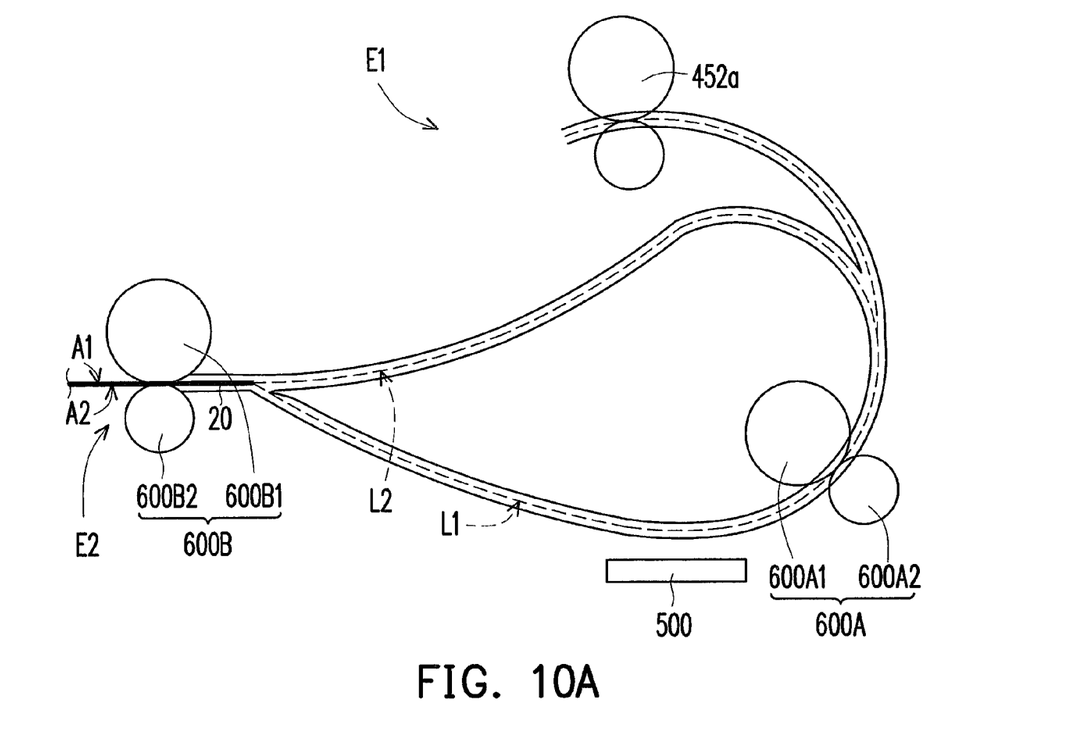
Figure 10B:
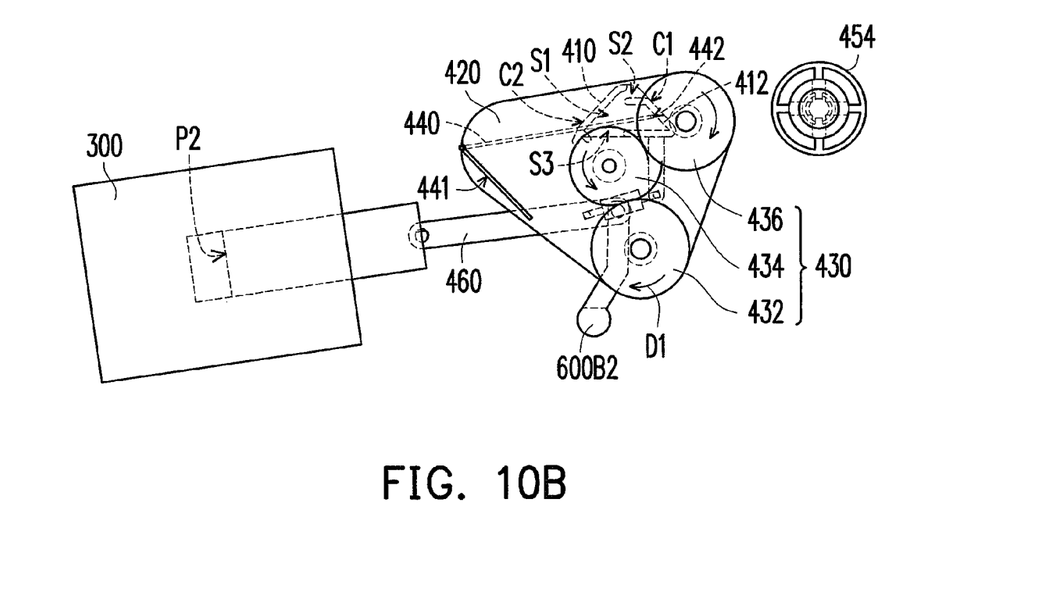

Please refer to FIG. 10A and FIG. 10B, when the paper 20 is second time turned over, the motor 200 proceeds to drive the roller set 600A and 600B to rotate in the first direction D1, and the paper 20 is transmitted out of the body 100 via the paper outlet E2 and the paper 20 is maintained in the same status as originally placed at the paper inlet E1. In addition, in this time the swinging member 420 swings along the first direction D1 with the active gear 432, but the second end 442 of the blocking member 440 is still blocked at the second blocking portion 412 and limited in the limiting space S1.

Figure 11:
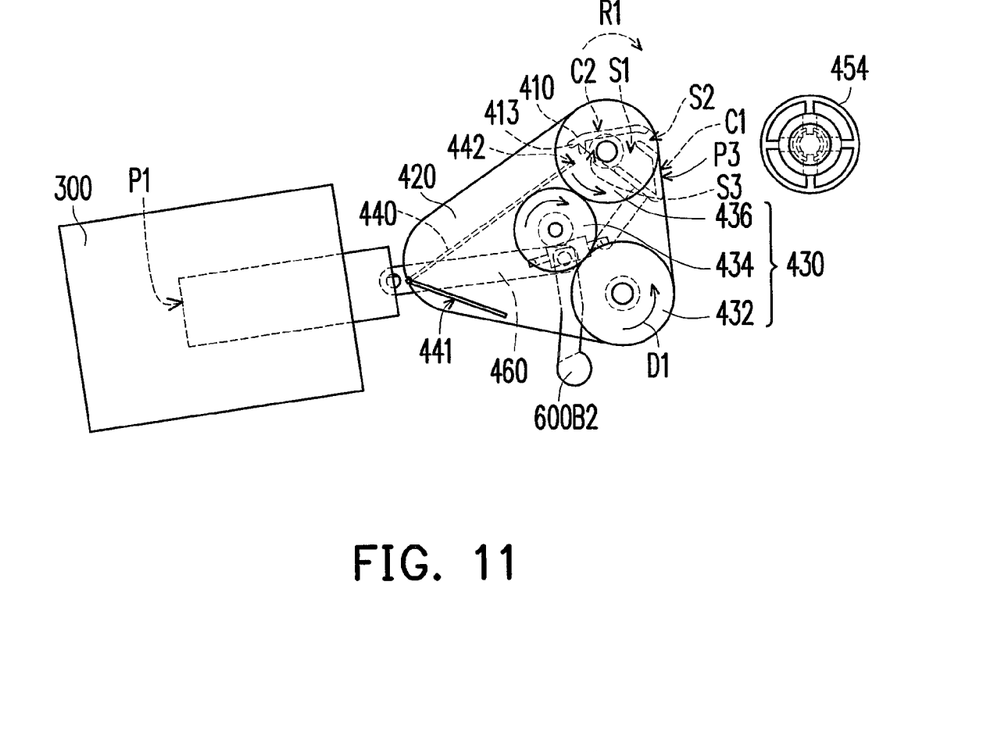
Figure 12:
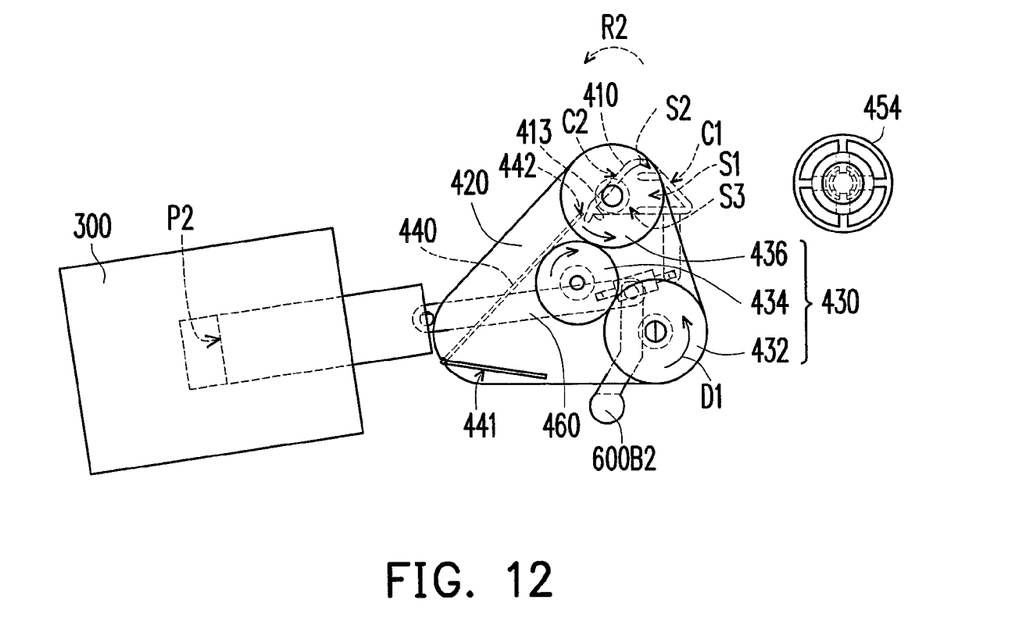

Please refer to FIG. 11 and FIG. 12, after the paper 20 is entirely transmitted out to the body 100, the electromagnetic valve 300 drives the limiting structure 410 to move to the first position P1, then the motor 200 drives the active gear 432 to rotate along the second direction D2 to drive the swinging member 420 to swing along the second direction D2, such that the second end 442 of the blocking member 440 is further removed from the outlet S3 of the limiting structure 410 out of the limiting space S1. After the second end 442 is separated from the limiting structure 410, the electromagnetic valve 300 drives the limiting structure 410 to move back to the second position P2, so that the second end 442 of the blocking member 440 is contacted to the second outer profile C2 of the limiting structure 410. Accordingly, when the motor 200 drives the document feeding roller 452a along the first direction D1 to transmit the paper 20 into the body 100 via the paper inlet E1, the second end 442 of the blocking member 440 moves across over the limiting structure 410 along the second outer profile C2 by the swinging member 420, and returns to the location as shown in FIG. 4B for the convenience of the multi-function peripheral 10 repeating the document feeding process.

In light of the foregoing, in the embodiment of the present invention, through the moving paths of the swinging member and the blocking member of the automatic document feeding device cutting across each other and implementing together with the moving path of the limiting structure, the multi-function peripheral uses only one motor actuation and implementation with the sequence of the components described above, the paper can be turned over within the multi-function peripheral, and thus double-sided printing (scanning) process can be successfully performed. Furthermore, the swinging member and the blocking member are simple in structures, and the limiting structure is driven by the electromagnetic valve which is originally disposed in the body, thus the fabricating cost of the multi-function peripheral can be effectively reduced.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:
1. A multi-function peripheral, comprising:
a body, having a paper inlet and a paper outlet, a paper is adapted to be transmitted into the body via the paper inlet and transmitted out of the body via the paper outlet;
a motor, disposed in the body;
an electromagnetic valve, disposed in the body;

an automatic document feeding device, comprising:
- a limiting structure, pivoted to the body and connected to the electromagnetic valve, the electromagnetic valve driving the limiting structure to move between a first position and a second position, the limiting structure having a limiting space;
- a swinging member, pivoted to the body;
- a gear set, disposed on the swinging member and connected to the motor, the motor driving the gear set so as to drive the swinging member to move between a third position and a fourth position, the gear set includes:
  - an active gear, connecting the motor and the swinging member, the motor drives the active gear to rotate so that the active gear drives the swinging member to swing;
  - a joining gear;
- a blocking member, having a first end and a second end opposing thereto, the first end disposed on the swinging member so that the blocking member moves along with the swinging member, the second end extending from the swinging member to the limiting structure, wherein a moving path of the second end and a moving path of the limiting structure cut across each other; and
- a document feeding gear, assembled to the body and located on the moving path of the swinging member, wherein when the swinging member is located at the fourth position, the gear set is coupled to the document feeding gear, so as to transmit the paper into the body, when the swinging member removes from the fourth position, the gear set is separated from the document feeding gear, wherein when the swinging member is located at the fourth position, the joining gear is coupled to the document feeding gear, wherein when the limiting structure is located at the second position, and when the swinging member moves from the fourth position to the third position, the second end is trapped into the limiting space, when the swinging member moves toward the third position, and when the limiting structure moves toward the first position, the second end is separated from the limiting space.

2. The multi-function peripheral as claimed in claim 1, wherein the body further has a processing path and a paper feed back path forming a loop between the paper inlet and the paper outlet.

3. The multi-function peripheral as claimed in claim 2, further comprising a processing module, wherein the processing module is formed by a printing unit, a scanning unit or a combination thereof, so as to perform printing, scanning or a combination thereof of an imaging process to the paper passing through.

4. The multi-function peripheral as claimed in claim 1, wherein the swinging member and the active gear share a shaft, and the joining gear moves along with the swinging member and surrounds the active gear.

5. The multi-function peripheral as claimed in claim 1, wherein a shaft of the document feeding gear, a shaft of the swinging member, a shaft of the gear set and a shaft of the limiting structure are parallel to each other.

6. The multi-function peripheral as claimed in claim 1, wherein the gear set further comprises:
- an idle gear, coupled between the active gear and the joining gear, so that the joining gear and the active gear rotates in a same direction.

* * * * *